United States Patent

Rullman et al.

[11] Patent Number: 5,856,777
[45] Date of Patent: Jan. 5, 1999

[54] SIMULATED VEHICLE ALARM

[76] Inventors: Richard L. Rullman; Peter C. Rullman, both of 6220 Pansy Dr., Beaumont, Tex. 77706

[21] Appl. No.: 698,032

[22] Filed: Aug. 15, 1996

[51] Int. Cl.$^6$ ................................................. B60R 25/10
[52] U.S. Cl. .................. 340/426; 340/691.2; 340/693.8; 340/815.45; 362/800; 307/10.8
[58] Field of Search .................................. 340/425.5, 426, 340/815.45, 691, 693, 438, 457, 457.2, 428, 429; 362/61, 800; 307/10.8

[56] References Cited

U.S. PATENT DOCUMENTS

| | | | |
|---|---|---|---|
| 4,710,745 | 12/1987 | Del Rosario | 340/426 |
| 4,750,094 | 6/1988 | Krasik | 362/95 |
| 4,972,172 | 11/1990 | McLaughlin | 340/426 |
| 5,038,133 | 8/1991 | Martin | 340/438 |
| 5,583,480 | 12/1996 | Bartos | 340/426 |

FOREIGN PATENT DOCUMENTS 2639299  5/1990  France .

*Primary Examiner*—Daniel J. Wu
*Attorney, Agent, or Firm*—Stephen R. Greiner

[57] ABSTRACT

A simulated vehicle alarm including a housing formed of an electrically insulative material. A light-emitting diode is secured to the housing. A pair of electrically conductive leads are connected to the light-emitting diode and extend therefrom. A pair of electrical connectors are attached, respectively, to the free ends of the leads. Each of the connectors includes a strip of metallic foil having an adhesive layer applied to one of its sides. A strip of double-sided foam tape is secured to the housing for adhesively mounting the housing upon a supporting surface such as a vehicle windshield.

12 Claims, 1 Drawing Sheet

SIMULATED VEHICLE ALARM

FIELD OF THE INVENTION

The present invention relates generally to land vehicle alarms and indicators of burglary or unauthorized use.

BACKGROUND OF THE INVENTION

Electronic security systems for safeguarding vehicles are now commonplace. Such systems typically include motion sensors and other costly circuitry which detect entry into the vehicle and then sound an audible alarm. Experienced automobile thieves, however, are not deterred by these systems since they have developed techniques for rapidly overriding or disabling them.

Interestingly, most vehicle security systems available today include at least one flashing indicator light mounted in a position to alert passersby that the system is armed. It is believed by many that this light alone plays a significant roll in encouraging amateur thieves to proceed past the vehicle and pursue other quarry. Unfortunately, installing a vehicle security system having even one indicator light is time-consuming, requires permanent modification of the vehicle, and is prohibitively expensive for many individuals. A need, therefore, exists for an apparatus capable of deterring the unauthorized entry into vehicles of all sorts which is affordable by most individuals and is easy to install.

SUMMARY OF THE INVENTION

In light of the problems associated with the prior art vehicle alarm systems, it is a principal object of the invention to provide a simulated vehicle alarm having the external appearance of a flashing indicator light mounting structure found in a real vehicle alarm but is easy to install, requires no modification of a vehicle during installation, is fully automatic in its operation, and requires minimal electrical current to energize.

It is an object of the invention to provide improved elements and arrangements thereof in a simulated vehicle alarm which is lightweight, inexpensive, and dependable.

Briefly, the simulated vehicle alarm in accordance with this invention achieves the intended objects by featuring a housing with a light-emitting diode secured to it. A pair of leads extend from the light-emitting diode and have connectors at their free ends. The connectors include strips of metallic foil tape which may be attached, for example, to fuses forming part of an electrical circuit in a vehicle to energize the light-emitting diode. A strip of double-sided foam tape is secured to the housing for adhesively mounting the housing upon a supporting surface such as a vehicle windshield.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
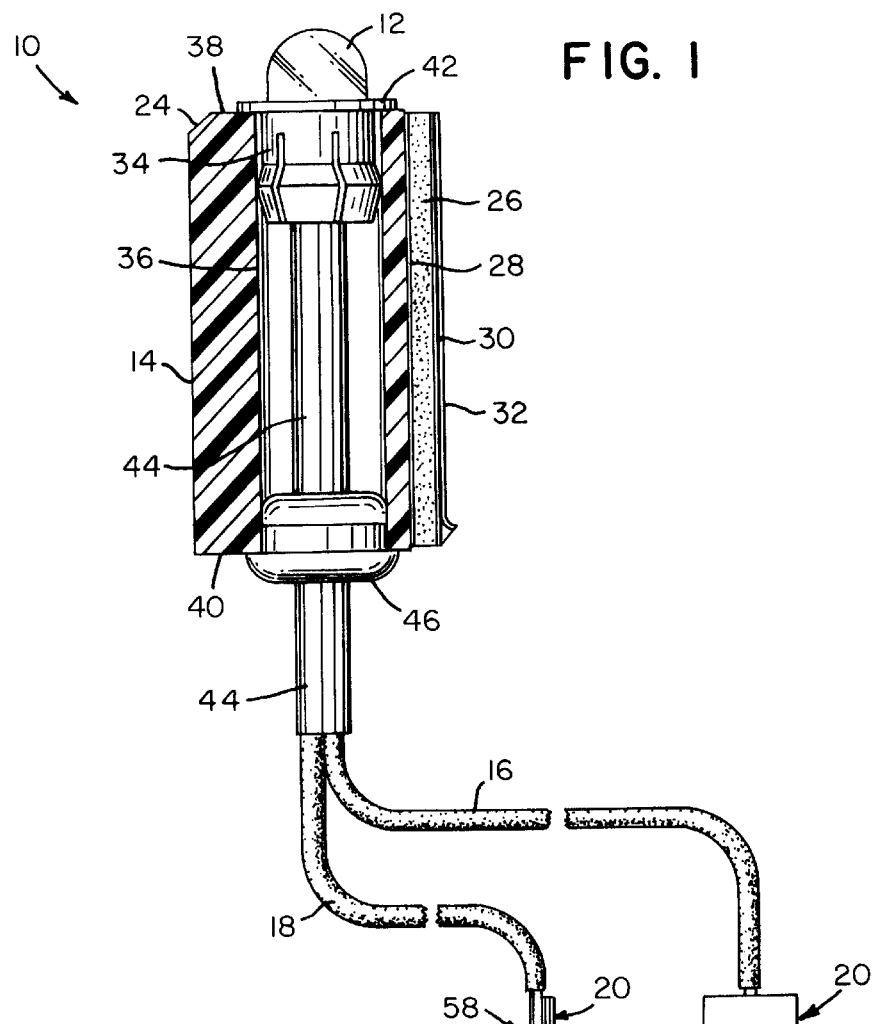
FIG. 1 is a side view of a simulated vehicle alarm in accordance with the present invention having portions broken away to reveal details thereof.

Referring now to the FIGS., a simulated alarm for use in boats, automobiles and like vehicles is illustrated at 10. The simulated alarm 10 includes at least one light-emitting diode (LED) 12 secured to a housing 14. A pair of electrical leads 16 and 18, operatively connected to the LED 12, extend outwardly from the housing 14. The free ends of the leads 16 and 18 have electrical connectors 20 which may be attached to blade-type fuses 22 used in a vehicle to prevent electrical circuit overloads. Upon insertion of the fuses 22 into the vehicle's fuse box (not shown) with the connectors 20 attached, the LED 12 may be energized to simulate the appearance of a real alarm system component.

To discourage unauthorized individuals from tampering with a vehicle equipped with the simulated alarm 10, it is important that the simulated alarm replicate the external appearance of an indicator light mounting structure being a part of a conventional vehicle alarm. Thus, it has been found that the housing 14 should comprise an elongated block formed of a thermoplastic or other polymeric material. Preferably, the housing 14 has a length of about 1", a width of about ½" and a height of about ½". To further enhance the simulative appearance of the housing 14, and reduce the amount of material required to form it, bevels may be provided along its exterior as at 24.

A pad of double-sided foam tape 26 is secured by means of its adhesive layer 28 to one side of the housing 14. Prior to use, the adhesive layer 30 of the tape 26 facing away from the housing 14 is covered by a protective release liner 32. Tape of this type is commercially available and offers not only excellent adhesion to curved surfaces such as automobile windshields under extremes in temperature and humidity but, also, somewhat absorbs shocks.

A mounting clip 34 receives the LED 12 and frictionally retains such within a longitudinal bore 36 extending between the opposed end walls 38 and 40 of the housing 14. The LED 12 extends outwardly from the bore 36 and its distal end is maintained by a shoulder 42 on the clip 34 approximately ⅛" from the end wall 38. This outward extension permits the LED 12 to be readily seen by passersby when illuminated.

The LED 12 preferably contains an integrated flasher/oscillator circuit which causes it to blink or flash in a manner similar to that of a conventional vehicle alarm's indicator light. To further enhance the visibility of the LED 12, its body may be provided with a red color. Many manufacturers of electronic equipment produce LEDs of this type. One LED found adequate for use in the instant invention, however, is model no. L56-BID, distributed by Kingbright Corporation, U.S.A., City of Industry, Calif.

A pair of insulated electrical leads 16 and 18 extend from the LED 12, through the bore 36, and outwardly from the housing 14. Although the electrical leads 16 and 18 may be provided with practically any length, 48" has been found to be more than adequate for installation of the simulated alarm 10 within, for example, an automobile. In an automobile, the preferred 48" length of the leads 16 and 18 permits the housing 14 to be mounted on the windshield with the LED 12 being connected to the fuse box typically located under the automobile's dashboard.

After the leads 16 and 18 are soldered to the LED 12, a protective sleeve 44, comprising a segment of heat-shrink tubing, is secured over a portion of their length. The preferred sleeve 44 is about 1½" in length and extends from the LED 12 through the longitudinal bore 36 to a point closely adjacent the end wall 40. The sleeve 44 deters moisture from reaching the LED 12 and resists chemical and fungal attack.

A resilient grommet 46 is partially fitted within the longitudinal bore 36 adjacent the housing end wall 40. The grommet 46 snugly supports within its central opening the leads 16 and 18 covered by the sleeve 44. As would be expected, the grommet 46 prevents moisture and deleterious material from entering into and collecting within the housing 14. It should be noted, however, that the grommet 46 does not provide stress relief to the leads 16 and 18 but such is not a great concern because the leads are not subjected to significant tensile loads during normal use of the simulated alarm 10.

An electrical connector 20, comprising a strip of metallic tape, is soldered to the free end of each of the leads 16 and 18. The tape includes a strip of metallic foil 48 having an adhesive layer 50 applied to one of its sides. Preferably, the connector 20 is 3/16" in width by 1¼" in length to facilitate its attachment to a fuse 22 or any other electrical current source. (To reduce the length of the connector 20, its free end may be folded back upon itself as shown in FIG. 1.) Prior to the attachment of the connector 20, a protective release liner 54 covers the adhesive 52.

The 3M Company of St. Paul, Minn., distributes a copper foil tape in rolls and sheets which may be readily utilized to form the connectors 20. The preferred 3M tape includes a strip of copper foil that is 5 mil thick bearing a layer of adhesive. Tape with this insignificant thickness will not cause a fuse to bind when being reinserted into a fuse box. The adhesive layer offers little electrical current resistance, permits the tape to be releasably secured to electrical conductors under a variety of conditions, and is vibration resistant.

Figure 2:
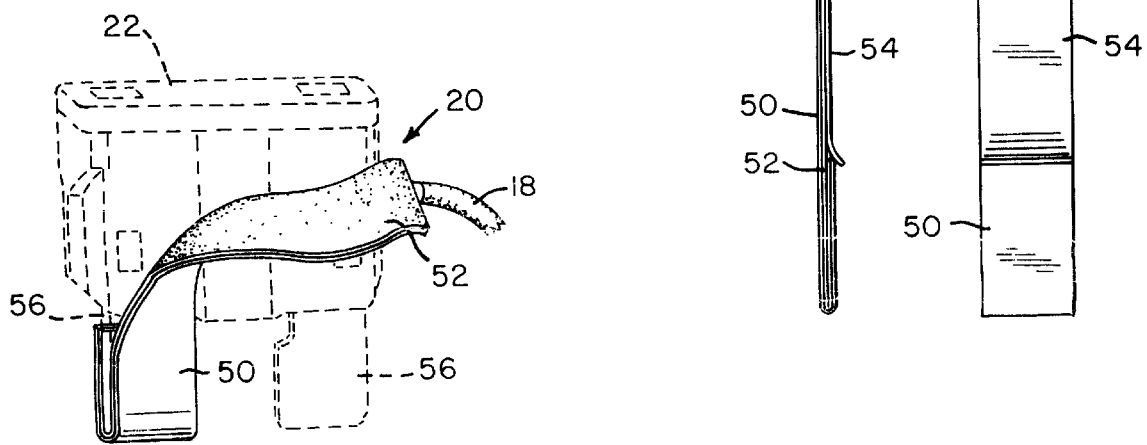
FIG. 2 is an perspective view showing an electrical connector of the simulated vehicle alarm being adhesively attached to a conventional vehicle fuse.

As illustrated in FIG. 2, each connector 20 may be adhesively attached to a conventional, blade-type fuse 22. To do this, the release liner 54 is first removed from the adhesive layer 52 and discarded. Next, the adhesive layer 52 is pressed against one side of a fuse leg 56. The connector 20 is then folded over the end of the leg 56 and onto the opposite side thereof.

The soldered end 58 of the connector should now extend about ¼" above the top of the fuse 22 to reduce the potential for binding in the fuse box. If this ¼" extension does not exist, the connector 20 may be readily repositioned to obtain it by pealing the connector from the fuse 22 and repeating the steps outlined above. Should the fuse 22 ever require replacement, the connector 20 need only be pealed from the old fuse and transferred to a new one.

To install the simulated alarm 10 in an automobile, for example, the positive lead 16 is secured to a fuse 22 which is always energized or "hot" regardless of whether the automobile's ignition switch is opened or closed such as the dome light fuse or the hazard warning light fuse. The negative lead 18, on the other hand, is preferably secured to a fuse which selectively receives electrical current through the ignition switch like the windshield wiper fuse. Once the connectors 20 are attached to two different fuses 22 as described, the fuses may be reinstalled in their original positions in the automobile's fuse box.

If the fuses are properly selected, the simulated alarm 10 is now armed and ready to operate for as long as the electrical current is provided from a suitable source, typically a 12-volt: storage battery. Opening the ignition switch energizes the LED 12 causing it to blink or flash since lead 16 is "hot" and lead 18 is connected to ground. When the ignition switch is closed, however, the LED 12 is deenergized since both of the leads 16 and 18 are now "hot" thereby preventing electrical current flow through the LED. When the LED 12 energized, it is estimated that drain on the current source is less than 1/100 of that required to operate a standard automobile clock.

While the invention has been described with a high degree of particularity, it will be appreciated by those skilled in the art that numerous modifications and substitutions may be made thereto. Therefore, it is to be understood that the present invention is not limited to the sole embodiment described above, but encompasses any and all embodiments within the scope of the following claims.

We claim:

1. A simulated vehicle alarm, comprising:
   a housing having opposed, first and second ends and a bore connecting said first and second ends;
   a light-emitting diode mounted in said bore adjacent said first end of said housing so that its light output is directed externally of said housing;
   a pair of electrically conductive leads connected to said light-emitting diode, said leads extending from said bore adjacent said second end of said housing; and,
   a pair of electrical connectors each being attached, respectively, to one of said electrically conductive leads, each of said electrical connectors including a strip of metallic foil having an adhesive layer on one side thereof.

2. The simulated vehicle alarm according to claim 1 wherein said housing is formed of an electrically insulative material.

3. The simulated vehicle alarm according to claim 1 wherein said light-emitting diode includes means to produce intermittent flashing.

4. The simulated vehicle alarm according to claim 1 further comprising a strip of double-sided foam tape secured to one side of the housing for adhesively mounting said simulated vehicle alarm upon a supporting surface.

5. The simulated vehicle alarm according to claim 1 further comprising a clip for receiving said light-emitting diode and mounting such within said bore, said clip having a shoulder for retaining a portion of said light-emitting diode on the exterior of said housing.

6. The simulated vehicle alarm according to claim 1 further comprising a protective sleeve of heat-shrink tubing secured about said pair of electrically conductive leads adjacent said light-emitting diode.

7. The simulated vehicle alarm according to claim 1 further comprising a resilient grommet secured within said bore adjacent said second end of said housing, said grommet having a central opening for the passage of said pair of electrically conductive leads.

8. A simulated vehicle alarm, comprising:
   a housing formed of an electrically insulative material;
   a light-emitting diode secured to said housing;
   a pair of electrically conductive leads connected to said light-emitting diode;
   a pair of electrical connectors each being attached, respectively, to the free end of one of said electrically conductive leads, each of said electrical connectors including a strip of metallic foil having a first adhesive layer on one side thereof, said first adhesive layer being covered by a first release liner; and,
   a strip of double-sided foam tape for adhesively mounting said simulated vehicle alarm upon a supporting surface, said tape having a second adhesive layer secured to one side of said housing and a third adhesive layer remote therefrom, said third adhesive layer being covered by a second release liner.

9. A simulated vehicle alarm, comprising:

a housing formed of an electrically insulative material, said housing having opposed, first and second ends and a bore connecting said first and second ends;

a light-emitting diode having means to produce intermittent flashing mounted in said bore adjacent said first end of said housing so that its light output is directed externally of said housing;

a pair of electrically conductive leads connected to said light-emitting diode and extending from said bore adjacent said second end of said housing;

a pair of electrical connectors each being attached, respectively, to the free end of one of said electrically conductive leads, each of said electrical connectors including a strip of metallic foil having a first adhesive layer on one side thereof, said first adhesive layer being covered by a first release liner; and, a strip of double-sided foam tape for adhesively mounting said simulated vehicle alarm upon a supporting surface, said tape having a second adhesive layer secured to one side of said housing and a third adhesive layer remote therefrom, said third adhesive layer being covered by a second release liner.

10. The simulated vehicle alarm according to claim 9 further comprising a clip for receiving said light-emitting diode and mounting such within said bore, said clip having a shoulder for retaining a portion of said light-emitting diode on the exterior of said housing.

11. The simulated vehicle alarm according to claim 9 further comprising a protective sleeve of heat-shrink tubing secured about said pair of electrically conductive leads adjacent said light-emitting diode.

12. The simulated vehicle alarm according to claim 9 further comprising a resilient grommet secured within said bore adjacent said second end of said housing, said grommet having a central opening for the passage of said pair of electrically conductive leads.

* * * * *